(12) United States Patent
King

(10) Patent No.: US 8,678,064 B1
(45) Date of Patent: *Mar. 25, 2014

(54) LAMINATING MACHINE

(71) Applicant: Michael T. King, Lyons, IL (US)

(72) Inventor: Michael T. King, Lyons, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/694,977

(22) Filed: Jan. 23, 2013

(51) Int. Cl.
 *B32B 37/00* (2006.01)
(52) U.S. Cl.
 USPC .......................................... 156/555; 156/582
(58) Field of Classification Search
 USPC ........... 156/555, 580, 582, 583.1; 492/15, 42, 492/47
 See application file for complete search history.

(56) References Cited

U.S. PATENT DOCUMENTS

| | | | | |
|---|---|---|---|---|
| 4,149,682 | A * | 4/1979 | Gustafson et al. | 242/571.3 |
| 5,580,417 | A * | 12/1996 | Bradshaw | 156/495 |
| 6,827,015 | B2 * | 12/2004 | Villarreal | 101/350.3 |
| 7,874,340 | B2 * | 1/2011 | King | 156/555 |

* cited by examiner

*Primary Examiner* — James Sells
(74) *Attorney, Agent, or Firm* — Gregory B. Beggs

(57) ABSTRACT

A laminating machine for making sheet laminations using a thermal laminating film is disclosed which protects the film from being mounted in the machine in a manner that will expose its adhesive side to the heated laminating rollers in the machine. The film is stored on upper and lower supply rollers in the machine. Each supply roller is engaged at one end by a forward end of a rotatable piston disposed in a variable-length spring operated chuck. A stem attached to the forward end of the piston extends rearwardly from the forward end and away from the roller into a cylindrically enclosed body portion of the chuck. There the stem is engaged by a one-way needle bearing which permits the film to be unwound from the supply roller only in one direction, thus permitting only the non-adhesive side of the film to contact the machine's heated laminating roller.

6 Claims, 3 Drawing Sheets

LAMINATING MACHINE

This is a non-provisional application which claims the filing date of the same inventor's provisional application Ser. No. 61/632,539, filed in the United States Patent and Trademark Office on Jan. 26, 2012.

This invention relates to improvements in machines for covering pages of copy material with film by encasing them between layers of film. More particularly, it relates to introducing upper and lower layers of laminating film wound on supply rollers into a laminating machine easily in registration with each other and insuring that the adhesive layers of the laminating film on each of the rollers does not contact the heated film laminating rollers in the machine as the film from each laminating film supply roller is unwound.

Except for the provisional application just referred to, there are no patent applications related to this one. This application is not subject to any federally sponsored research or development or to any joint research agreement. The inventor in this application is also the inventor of the invention in U.S. Pat. No. 7,874,340 entitled "Laminating Machine."

BACKGROUND OF THE INVENTION

Prior to the improvements described in this application, a laminating machine known as "GBC Ultima 65 School Laminator" was promoted by General Binding Corporation in their 2001 Bulletin No. 1630371 3MO202, copyright 2001. A large number of the machines described in that brochure have presumably been in use in schools and offices which require sheet laminating equipment.

However, correctly threading the films from the film supply rollers has proved difficult for many classroom instructors, especially in aligning the webs of film with each other as they are inserted into the machine and thereafter placing them on the heated laminating rollers without having the adhesive coated side of the film contacting those rollers.

SUMMARY OF THE INVENTION

The present invention is embodied in a laminating machine which has upper and lower laminating rollers with outer surfaces rotatably moving toward each other at a nip between them. There are also upper and lower laminating film supply rollers from which webs of film extend onto the laminating rollers and are drawn through the nip. An object to be encased in laminating film is inserted between the webs of film at the nip and is encased there as the object, sandwiched between the upper and lower films, is drawn through the nip. The laminating film, which has a non-adhesive polyester layer and an adhesive polyethylene layer, is placed with its adhesive side on the object where it is fastened onto the object as the object and film pass the nip. First and second frame members support the laminating rollers and the film supply rollers. Each of the laminating film supply rollers has a socket formed at one end so that a spring-loaded chuck, affixed on one of the frame members, may be engaged in the socket when the supply roller is installed in order to position and support the supply roller on the frame.

Downstream from the heated laminating rollers, draw rollers (not shown) pull the laminating films around the heated laminating rollers and through the nip between them.

A rotational direction member is engaged on the chuck member and restricts it, and the supply roller in which it is engaged, to rotation only in a single direction. Thus restricted, the laminating film supply roller unwinds the film only with the adhesive layer facing away from the heated laminating roller so that it does not contact that roller as the film passes around it.

From the foregoing, and from the detailed description which follows, it will be apparent that the laminating machine described herein allows a classroom instructor or secretarial person to quickly and successfully replace supply rolls of laminating film.

It is one object of this invention to provide a laminating machine in which installing films from the upper and lower laminating film supply rollers on the machine's heated laminating rollers is accomplished correctly and rapidly.

It is a further object of this invention to provide a laminating machine in which the installation of the film can only be accomplished in a manner which insures that the adhesive layer of the film directly engages an object being laminated.

It is a further object of this invention to provide a laminating machine in which the installation of the upper and lower laminating film supply rollers may always be accomplished by relatively unskilled personnel.

It is a further object of this invention to provide a laminating machine in which installation of the laminating film supply rollers will always be accomplished in a manner which avoids the possibility of unwinding a supply roller with the adhesive layer of the film disposed to contact the heated laminating roller of the machine.

Other objects and features of this invention will be apparent to those persons who are skilled in the practical art of designing and using machines for enclosing sheets of materials such as paper between laminating films, particularly after reviewing the following description of the preferred embodiments of the present invention and the accompanying drawings.

DETAILED DESCRIPTION OF THE INVENTION

Figure 1:
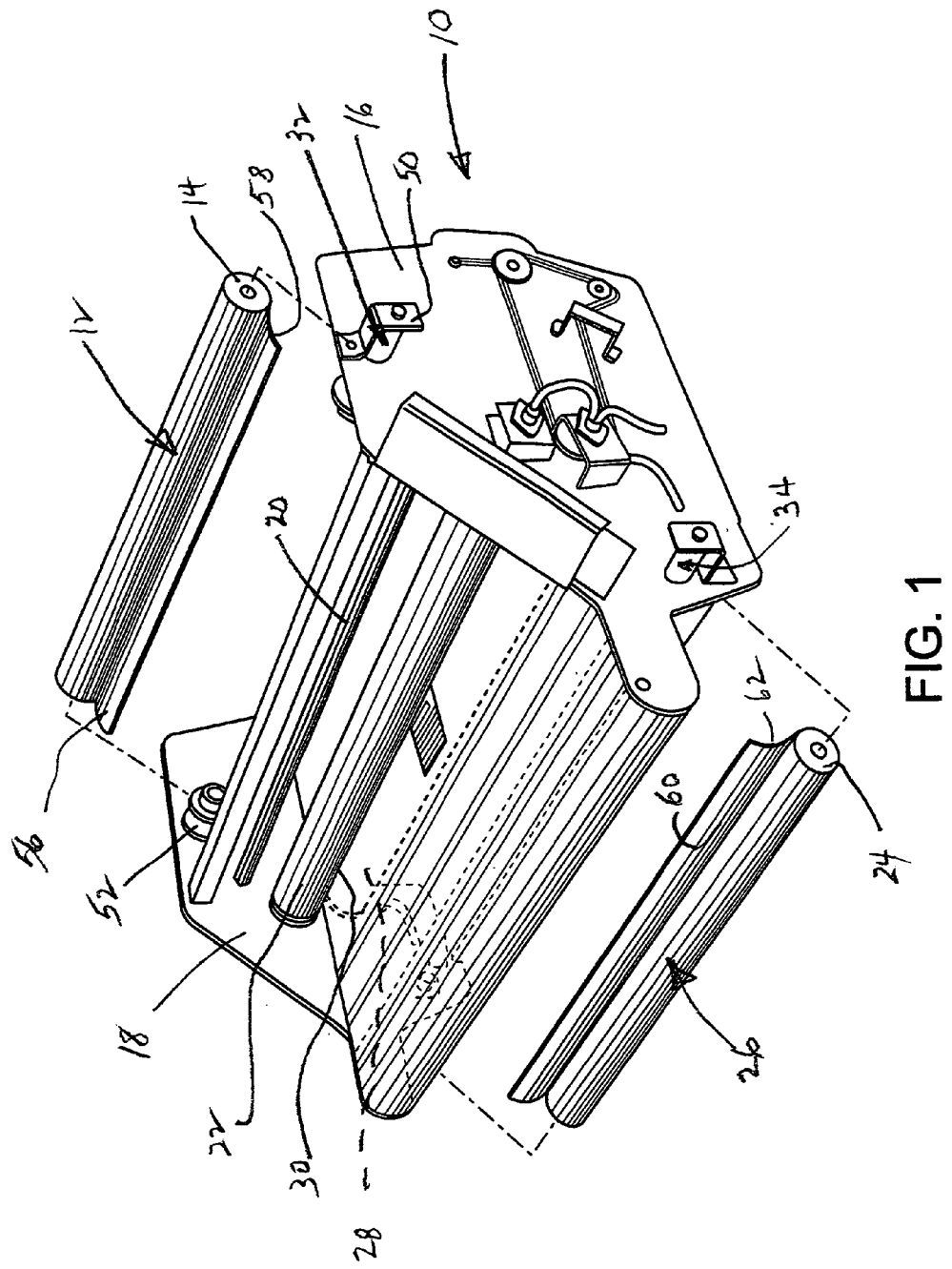
FIG. 1 is an exploded view of elements of the laminating machine of this invention illustrating the initial positions of the upper and lower laminating film supply rollers as those film supply rollers are ready to be mounted between the side frames of the machine and held in place by chuck assemblies in one of the side frames as the film supply rollers are ready to be unrolled.
Figure 5:
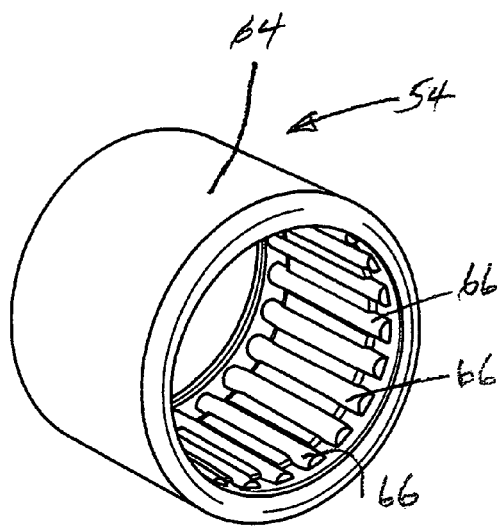
FIG. 5 is an enlarged, perspective view of the one-way needle bearing shown in the chuck assembly in FIGS. 3 and 4.

Elements of the improved laminating machine 10 of this invention are shown in perspective in FIG. 1. An upper laminating film 12 is shown wound around upper laminating film supply roller 14, and the roller 14 is shown in position to be installed in the machine 10 between side frames 16 and 18. The path of film 12, as shown in FIG. 5, extends below an idler roller 20 and around a heated upper laminating roller 22. A lower laminating film supply roller 24 which carries a supply of lower laminating film 26 is shown in position to be installed in the machine 10 between the side frames 16 and 18. The path of the lower laminating film 26 is similar to the path of the upper laminating film 12 except that lower laminating film 26 extends around heated lower laminating roller 28. The upper laminating film 12 and the lower laminating film 26 meet at a nip 30 between the heated upper laminating roller 22 and the heated lower laminating roller 28. An object to be laminated (not shown) is inserted between the upper laminating film 12 and the lower laminating film 26 so that it is sandwiched between the upper and lower films as they pass through the nip 30. The heated laminating rollers 22 and 28 are heated electrically to about 240 degrees Fahrenheit so that they are hot enough to soften the films 12 and 26 and cause them to adhere to the object being laminated, as will be described below.

The step of installing the supply rollers must be capable of being done by a classroom instructor or secretary without having to call an assistant. Moreover, after the supply rollers are installed in the laminating machine, threading the films on them onto and between the heated laminating rollers must be accomplished smoothly without requiring an operator to bring his hands close to or touch the heated laminating rollers. One such manner of installing the films is described in U.S. Pat. No. 7,874,340, but other procedures may be used. Whatever procedure is employed, it is important to be sure that the adhesive layer of the film is not brought in contact with the heated rollers.

Thermal laminating films normally have two layers, a polyethylene layer which is an adhesive, and a polyester layer which is a film layer. When such laminating films are wound on a supply roller, it is important to install the supply roller in the laminating machine so that as it is unwound the polyester layer is the one which contacts the heated laminating roller, not the polyethylene layer. One manner of insuring that the layers are properly oriented is to restrict unwinding the film from the laminating film supply roller to one direction only. The variable-length chuck in the present invention is constructed so that the piston member in the chuck can only rotate in a single direction, and thus, the laminating film supply roller which the piston engages is only permitted to unwind when the laminating film on the supply roller has its polyethylene side facing away from the heated laminating roller and onto the object being laminated.

Figure 2:
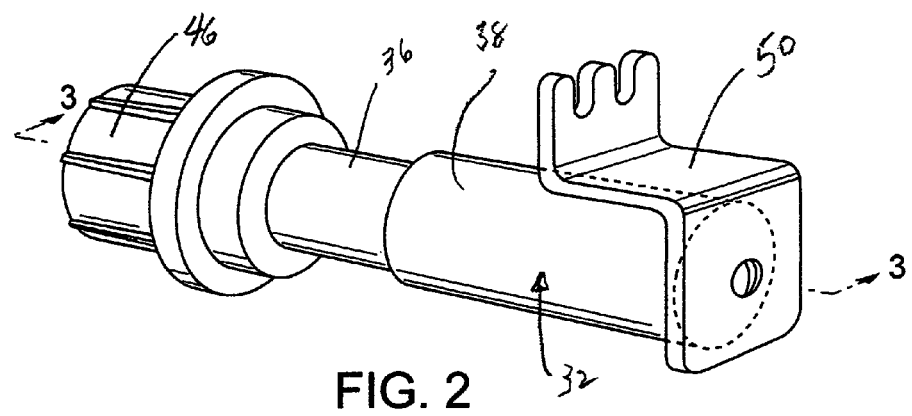
FIG. 2. is an enlarged perspective view of a chuck assembly of this invention.

In the laminating machine of this invention, the laminating film supply rollers 14 and 24 are held in place between the frame members 16 and 18 by variable length spring-loaded chucks at one end and fixed length chucks at the other end. In FIG. 1, the variable length chucks are shown at 32 for the upper laminating film supply roller 14 and at 34 for the lower laminating film supply roller 24. Variable length chuck 32 is shown in enlarged perspective in FIG. 2, and since variable length chuck 34 is identical except for the direction in which the piston inside rotates, chuck 32 may be taken as typical.

Chuck 32 includes a stem member 36 which is slidably disposed in a cylindrical body 38. An abutment 40 is located in one end of the cylindrical body 38, and a pin 42 extends through the abutment to engage the stem 36. Inside the cylindrical body 38, a coil spring 44 surrounds the pin 42 and at one end engages the abutment 40. Opposite that engagement on abutment 40, the coil spring's other end may be affixed to pin 42, or it may extend far enough to engage stem 36. Pin 42 extends slidably through the abutment 40 so that when the stem 36 is moved inside the cylindrical body 38 toward the abutment 40, stem 36 will compress spring 44 against the abutment 40. A portion of pin 42 inside the spring 44 will be forced on through the abutment 40 and move beyond the abutment. When pressure on the stem 36 is relaxed to the point that spring 44 can expand, stem 36 will be moved in a direction away from the abutment 40, and much of pin 42 will be brought back inside the cylindrical body 38.

At the other end of stem 36, outside the cylindrical body 40, a chuck head portion 46 is formed which fits into an open end of a tubular core, or similar engagement dock, forming a socket portion 48 in the end of the upper laminating film supply roller 14. Together, stem 36 and the head 46 form a piston which moves back and forth in the cylindrical body 38 of chuck 32 against the coil spring 44 and positions the chuck head portion 46 firmly in the socket portion 48 of supply roller 14.

The spring-loaded chuck 32 is mounted on frame member 16, as shown particularly in FIG. 1. Chuck 32 may be held in place there by bracket 50. A fixed-length chuck 52 is mounted in frame member 18 opposite the location of chuck 32 and is engageable in a second socket portion on the other end of the upper laminating film supply roller 14 which is similar to socket portion 48. When it is necessary to change the upper laminating film supply roller from an old one to a new one, an operator pushes the roller to be removed axially against the variable-length chuck 32 until the end of the supply roller engaged on the fixed-length chuck is freed from that chuck and can be lifted from it. Thereafter, the end of the old supply roller engaged on chuck 32 may be freed from chuck 32 and that roller removed from the laminating machine and either be thrown away if it is spent, or stored if it still has film.

Installing a fresh upper laminating film supply roller, for both the upper and lower film supply rollers, is quite similar to the removal steps just described. Thereafter, the films from either or both of the supply rollers are threaded between the heated laminating rollers. One manner of threading the films is described in U.S. Pat. No. 7,874,340, though other procedures may be used. As noted previously, it is important to avoid having an operator's hands touch the heated laminating rollers. An appropriate tool may be used to press the ends of the upper and lower films between the laminating rollers, but the threading process is increasingly difficult if the films should become adhesively stuck on the heated rollers. Even if the films do not immediately adhere to the heated rollers, the same adhesive problem may occur later during successive laminating activities.

Figure 6:
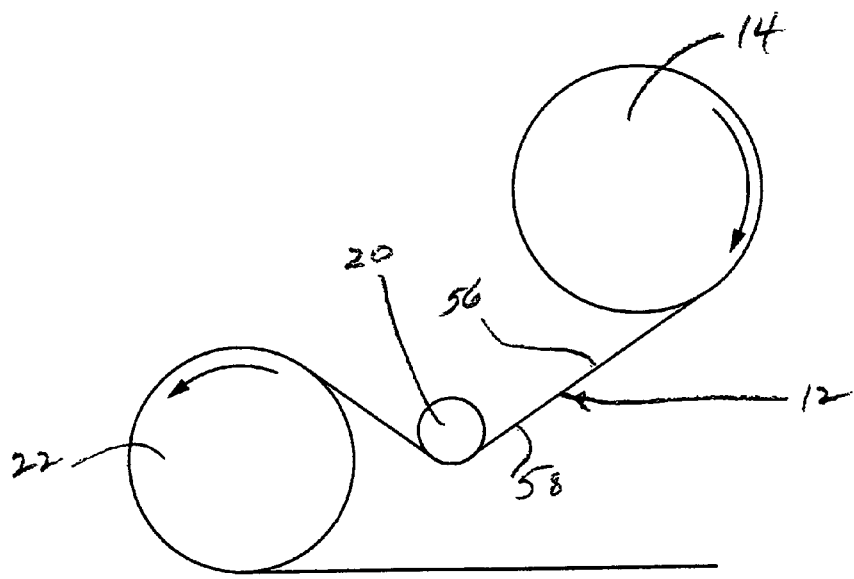
FIG. 6 is an enlarged diagramatic view of a portion of a web of laminating film from the upper laminating film supply roller passing under an idler roller and around a heated laminating roller in the laminating machine of this invention.

The present invention avoids the myriad aspects of permitting the adhesive layer of a thermal laminating film coming in contact with the heated laminating rollers of a laminating machine by making it impossible for a supply roll of laminating film to be installed incorrectly. Viewing the upper laminating film supply roller as typical, a rotational direction member is installed in chuck 32 which limits rotation of that chuck to one direction, and consequently the upper laminating film supply roller 14 is limited to unrolling only in one direction. The result, assuming that the manufacturer of the film 12 wound it correctly on roller 14, is that the film 12 will only unwind with its upper layer 56, which is the adhesive layer, facing away from upper heated laminating roller 22 as the film passes that heated roller. The lower, non-adhesive layer 58 of film 12 is the only layer of film 12 which contacts roller 22. A like rotational direction member (not shown) is installed in the chuck member 34 to limit film 26 to unrolling with its adhesive side 60 (see FIG. 1) facing away from the lower heated laminating roller 28 as film 26 passes that heated roller. The non-adhesive layer 62 of film 26 is the only layer of film 26 which contacts roller 28. The path of the upper laminating film 12, including its adhesive and non-adhesive sides is illustrated in FIG. 6.

Figure 3:
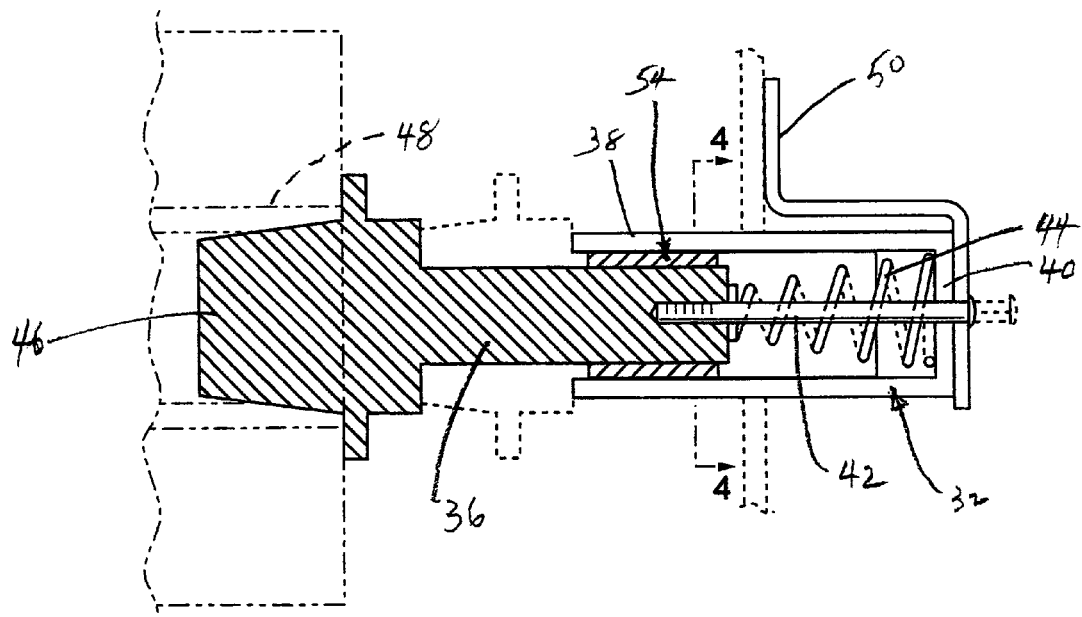
FIG. 3 is a sectional view of the chuck assembly of FIG. 2, taken along the line 3-3 in FIG. 2.
Figure 4:
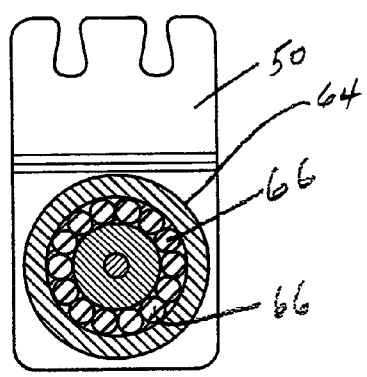
FIG. 4 is a sectional view of the chuck assembly in FIG. 3, taken along the line 4-4 in FIG. 3. illustrating a cross section of a one-way needle bearing disposed around a trailing stem portion of a piston in the chuck assembly of FIG. 3.

One form of a rotational direction member 54 is the one-way needle bearing shown in FIGS. 3, 4 and 5. That bearing includes a circular collar portion 64 which forms a bearing cage for the cylindrical bearing rollers 66. Member 54 is disposed inside the cylindrical body 38 of chuck 32 and encircles the stem member 36 of the piston formed by stem 36 and head portion 46 in chuck 32. Another rotational direction member (not shown) which may be a duplicate of the member 54, except that it limits rotation of the lower laminating film supply roller 24 to presenting the adhesive layer 60 of film 26 to meet the adhesive layer 56 of film 12 at the nip 30 between upper and lower heated laminating rollers 22 and 24, is contained in lower chuck 34.

From all of the foregoing it will be evident that, although particular forms of the invention have been illustrated and described, nevertheless various modifications can be made without departing from the true spirit and scope of the invention.

I claim:

1. In a laminating machine comprising upper and lower laminating rollers having first and second ends and outer surfaces rotatably moving toward each other adjacent a nip between them, upper and lower laminating film supply rollers having first and second ends and outer surfaces substantially parallel to the laminating rollers, frame members opposite each other at the ends of the upper and lower laminating rollers and the upper and lower film supply rollers, and socket portions in the ends of the laminating film supply rollers, the improvement comprising a variable length spring-loaded chuck member having a forward end arranged to engage a laminating film supply roller socket portion mounted on a frame member and including a chuck head portion at the forward end of the chuck member, a spring portion compressed between the head portion and an abutment in the chuck member permitting movement of the head portion at the forward end of the chuck member back and forth against the spring portion and urging the head portion into engagement with the laminating film supply roller socket portion, said spring-loaded chuck member also supporting the end of the laminating film supply roller on the head portion or releasing that end of the laminating film supply roller from the frame member, and a rotational direction member engaged on the chuck member and configured to restrict the chuck member and the laminating film supply roller to rotation in a single direction.

2. The laminating machine of claim 1 in which the chuck member comprises a cylindrical body and a piston slidably mounted in the cylindrical body, and the rotational direction member is engaged on the piston.

3. The laminating machine of claim 2 in which the rotational direction member is disposed intermediate the cylindrical body and the piston.

4. The laminating machine of claim 1 which includes a stem portion of the piston disposed within the cylindrical body and the rotational direction member is engaged on the stem portion.

5. The laminating machine of claim 4 in which the rotational direction member is engaged on the cylindrical body of the chuck member and the stem of the piston.

6. The laminating machine of claim 2 in which the rotational direction member is a needle roller bearing.

* * * * *